Jan. 30, 1945.  M. UNGER  2,368,503
ELECTRIC APPARATUS
Filed Oct. 14, 1941
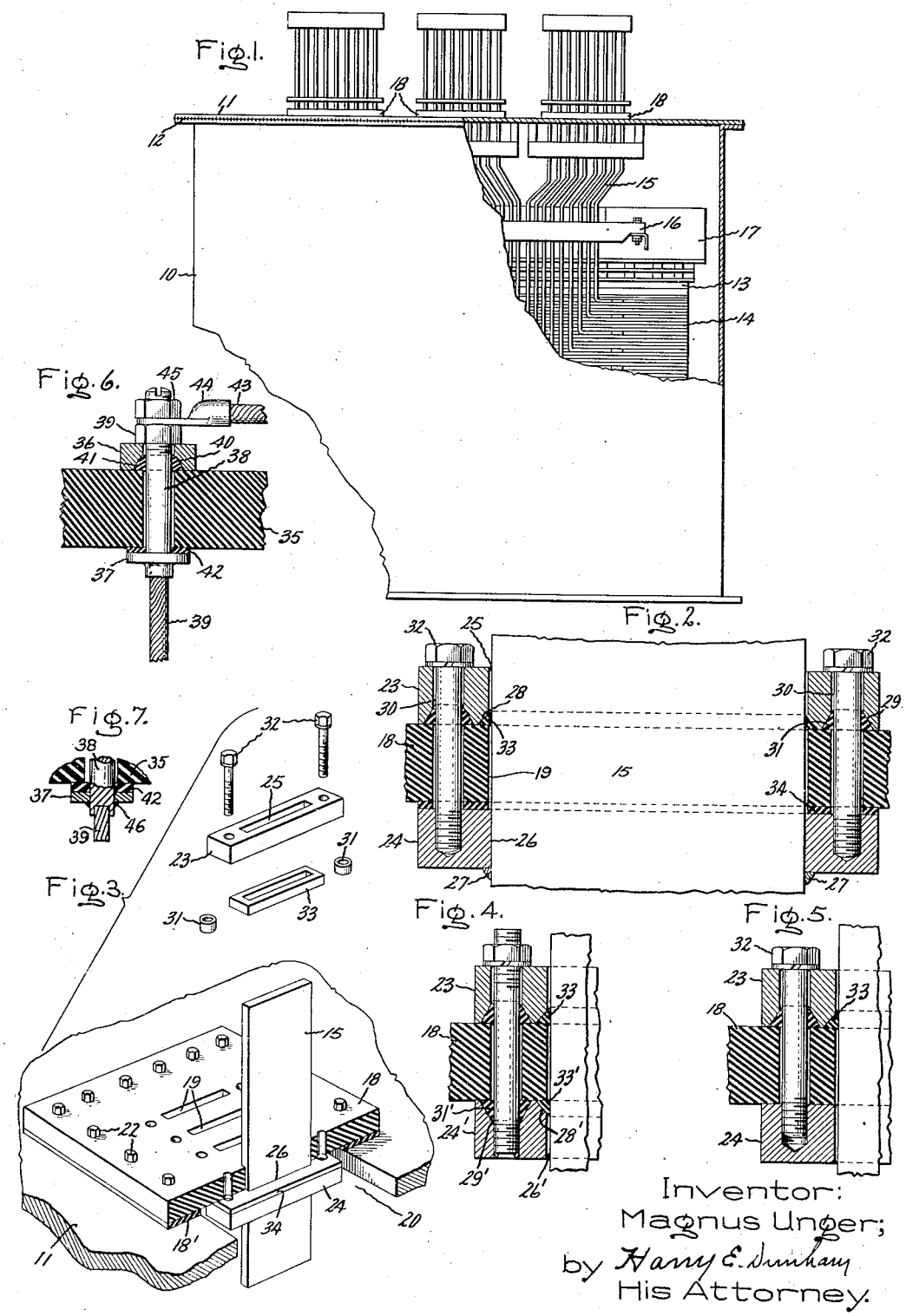
Inventor:
Magnus Unger;
by Harry E. Dunham
His Attorney.

Patented Jan. 30, 1945

2,368,503

UNITED STATES PATENT OFFICE 2,368,503

ELECTRIC APPARATUS

Magnus Unger, Pittsfield, Mass., assignor to General Electric Company, a corporation of New York Application October 14, 1941, Serial No. 414,925

3 Claims. (Cl. 174—18)

My invention relates to electric apparatus, and to an arrangement for providing a gas- and oil-tight seal between a conductor which is adapted to pass through an aperture in the casing of the apparatus and the casing, and although not limited thereto it has application to a gas- and oil-tight seal for bus bar outlets of transformers.

Stationary induction apparatus, such as the furnace transformer type, usually have a large number of relatively large bus bars which are connected to the low voltage winding and which must pass through the enclosing tank or casing of the transformer. Transformers of this type have been made with a dust proof bus bar outlet construction, the transformer being designed with an air space above the oil, this air space communicating with the atmosphere. When such transformers are designed to be of the conservator type, that is to be closed to the atmosphere and have a gas cushion in the conservator sufficiently large to accommodate for changes in volume due to changes in temperature, gas- and oil-tight seals must be made between each of the several bus bars and the enclosing casing.

It is therefore an object of my invention to provide an improved oil- and gas-tight seal between the bus bars which pass through apertures in the enclosing casing of transformers of the above-mentioned type, and the enclosing casing.

Another object of my invention is to provide an improved gas- and oil-tight seal between a conductor which is adapted to pass through an enclosing casing of an electric apparatus and the enclosing casing.

A further object of my invention is to provide an improved seal between a conductor and a casing having an opening which is adapted to receive the conductor.

Further objects and advantages of my invention will become apparent from the following description referring to the accompanying drawing, and the features of novelty which characterize my invention will be pointed out with particularity in the claims annexed to and forming a part of this specification.

In the drawing, Fig. 1 is a side elevation of a transformer, the casing being partly broken away, which is provided with an embodiment of my invention; Fig. 2 is a sectional side elevation of a portion of the gas- and oil-tight seal which is provided between each of the bus bar outlets and the cover of the transformer illustrated in Fig. 1; Fig. 3 is an exploded perspective view of the several parts of the seal illustrated in Fig. 2, and Figs. 4, 5, 6 and 7 are modifications of the seal illustrated in Figs. 2 and 3.

In the arrangements illustrated in the drawing, I have provided a gas- and oil-tight seal which is employed between the several bus bars which are connected to the low voltage winding of a furnace transformer, and the enclosing casing. With such a construction, it is possible to design a transformer of the furnace type which may be closed to the atmosphere. It is of course to be understood, however, that my improved seal may be employed with any other suitable electrical apparatus for providing a seal between any suitable conductor which is adapted to pass through an aperture in the casing and that casing. The illustrated construction includes an insulating plate having an opening to accommodate a bus bar, the insulating plate being relatively tightly attached to the outer surface of the casing. On both sides of the insulating plate, I provide a metallic plate, each having an opening adapted to receive the bus bar. At least one of the metallic plates has a cutaway or recessed portion which is adapted to receive a gasket, the gasket having an opening for receiving the bus bar. The metallic plates are relatively tightly secured to the insulating plate and as the recessed or cutaway portion is slightly smaller than the normal size of the gasket, the latter will be compressed into tight engagement with the surfaces of the recessed portion and the surface of the conductor. The inner metal plate may be brazed around its aperture to the surface of the bus bar, if desired.

Referring more particularly to Fig. 1 of the drawing, I have illustrated an electric apparatus of the furnace transformer type having a casing 10 and a cover 11 which is adapted to be tightly secured to the casing 10 in any suitable manner such as by welding, as is shown at 12, or by any other suitable means. Within the transformer, there is provided a core having a plurality of winding legs, one such leg 13 being partially illustrated. A plurality of coils 14 surround the winding leg and a plurality of conductors or bus bars 15 are connected to the winding 14. A suitable bracket 16 is provided for supporting the bus bars and for insulating them from each other, the bracket being supported by a portion of the yoke 17 of the core. Any suitable number of conductors or bus bars may be employed, and in the illustrated embodiment of my invention it will be seen that a total of twenty-seven bus bars extend through the cover 11 of the casing, so that if a conservator type transformer is desired, a gas- and oil-tight seal must be provided between each of the conductor or bus bar surfaces and the casing.

In order, therefore, to provide a gas- and oil-tight seal between the conductors or bus bars 15 and the casing, I provide an insulating plate 18 which has a plurality of openings 19 for receiving a number of the bus bars. Since the bus bars extend through the cover 11 of the casing in three groups of nine each, the insulating plate 18 is provided with nine openings 19 for receiving the nine conductors or bus bars 15. It is to be understood, of course, that the insulating plate 18 may be provided with any suitable number of openings 19 to receive any desirable number of conductors. The insulating plate 18 may be composed of any suitable material and I have found that a laminated resin bonded cellulosic material may be efficiently employed.

Referring to Fig. 3, it will be seen that a portion of the cover 11 is illustrated which is provided with an aperture or opening 20 for receiving the nine bus bars of one of the groups. In order to secure relatively tightly the insulating plate 18 to the surfaces of the cover 11 around the aperture 20, I provide the insulating plate 18 around its periphery with a gasket 18' of any suitable material and with a plurality of holes which are adapted to receive bolts 22 which cooperate with holes in substantial registry with the holes in the cover 11. In this manner, a relatively gas-tight seal is provided between the edge portion of the insulating plate 18 and the cooperating outer surfaces of the cover 12.

To provide a gas-tight seal between each of the bus bars 15 and the insulating plate 18, individual seals are provided between each bus bar and the adjacent surface of the insulating plate 18, and since each of these seals is similar, only one will be described.

The seal between each of the bus bars 15 and the insulating plate 18 includes a pair of plates 23 and 24 which are on the inner and outer sides of the insulating plate 18, respectively. The plates 23 and 24 may be composed of any suitable material such as copper. The plate 23 is provided with an aperture 25 to receive the bus bar 15. Since a suitable washer or gasket is provided between the plate 23 and the cooperating surface of the insulating plate 18, no attempt has been made to provide a gas-tight seal between the surface of the aperture 25 and the adjacent surface of the bus bar 15, so as will be seen in Fig. 2, the bus bar easily slips into the aperture 25. In the construction illustrated in Figs. 2 and 3, however, an aperture 26 in the plate 24 is made of such size that a relatively snug or close fit is provided between the surface of the aperture 26 and the cooperating surface of the bus bar 15. It is to be understood, of course, that the opening 26 is of sufficient size that considering ordinary manufacturing tolerances, it will easily slip over the bus bar 15. In the arrangement illustrated in Fig. 2, the aperture 26 is made so that it will closely fit the adjacent surface of the bus bar 15 so that the inside surface between the plate 24 and the bus bar 15 may be brazed together as shown at 27. Any other suitable attaching arrangement may, of course, be employed. Thus, movement of the bus bars along the bus axis is prevented, which in turn prevents disturbance of the gaskets in service which might cause gas or oil leaks.

In order to obtain a relatively tight seal between the outer edge of the bus bar and the outer surface of the insulating plate 18, I provide the plate 23 with a cut-out or recessed portion 28. This recessed portion is in the surface of the plate 23 which is adjacent the aperture 25 and the outer surface of the insulating plate 18. A cut-out portion 29 is provided at the inner end of each of apertures 30 in order to receive gaskets 31 which surround bolts 32. A gasket 33 is provided having an original shape as illustrated in Fig. 3, it being rectangular in cross-section, and having a dimension which is slightly larger than that of the recessed portion 28. The washers 31 are also slightly larger than that of the recessed portion 29. Therefore, when the plate 23 is relatively tightly forced against the cooperating surface of the insulating plate 18, the gasket 33 will be deformed from a rectangular cross-section into a triangular cross-section and will tightly contact the cooperating surfaces of the bus bar, plate 23, and insulating plate 18 in order to provide a gas- and oil-tight design. The washers 31 will also be deformed in shape in order to make a tight joint around the bolts 32.

In order that the plates 23 and 24 may be relatively tightly secured to the cooperating surfaces of the insulating plate 18, apertures in substantial registry with the apertures 30 of the plate 23 are provided in the insulating plate 18 and the plate 24. Thus, the bolts 32 fit into these apertures and when tightly secured in place due to the cooperating threads on the ends of the bolts and the apertures in the plate 24, the plates 23 and 24 will be tightly drawn together with the insulating plate 18 between them. The gasket 33 may be made of any suitable material which will give a relatively tight seal and relatively long life, and I have found that a mixture of cork and chloroprene polymers may be employed. A flat, plate-like gasket 34 is provided between the cooperating surfaces of the plate 24 and the insulating plate 18 and this gasket may be composed of any suitable material in order to provide a seal and so that it will not contaminate the fluid dielectric within the transformer. Thus, if the transformer is filled with a fluid dielectric such as a chlorinated hydrocarbon, I have found cork to be a desirable material from which to make the gasket 34.

The construction shown in Fig. 4 employs a seal very similar to that employed in Figs. 2 and 3 except that the plate 24' has an aperture 26' slightly larger than the dimensions of the cooperating portion of the bus bar 15, since no brazing operation is made. In this construction it will be seen that the lower metal plate 24' is provided with a recessed or cutout portion 28', just as is the metal plate 23, for receiving a gasket 33' similar to the gasket 33, and with a cutout portion 29' for a gasket 31'.

In Fig. 5 I have illustrated still another construction which employs the insulating plate 18 and the metal plate 23 with the cutout portions and gaskets 31 and 33 similar to that illustrated in Figs. 2 and 3. The lower plate 24, however, has no gasket between it and the cooperating surface of the insulating plate 18 nor is it brazed or otherwise made integral with the bus bar 15.

Each of the constructions described above, I have found, provide a relatively fluid-tight seal, as each showed substantially no leaks when subjected successively to 30 pounds per square inch air pressure within the tank and 30 pounds per square inch oil pressure within the tank, these pressures being of course considerably higher than those which normally obtain during the expected life of electric apparatus, as described above. Thus, it will be seen that I have provided an improved gas- and oil-tight seal which may be employed between bus bars and the enclosing casing of a transformer, or between any conductor and the cooperating enclosing casing.

In the construction illustrated in Fig. 6 a plate 35 of any suitable material such as insulating material is provided, similar to the insulating plate 18 and which is relatively tightly attached to a surface of the casing over an aperture, by an arrangement similar to the bolts 22. Plates are provided on either side of the insulating plate 35 which include plates or washers 36 and 37. A conductor 38 passes through cooperating apertures in the plate 36 and the insulating plate 35 and the plate 37 is attached to the conductor 38 at its inner end in any suitable manner. Thus the conductor 38 may be formed with a shoulder which will provide the integral plate 37, or the plate may be formed separately and secured to the conductor 38 in any suitable manner such as by brazing, as is shown at 46 in Fig. 7. The conductor 38 is connected to the winding in any suitable manner, such as through a conductor or cable 39, the end of which being electrically connected to the inner end of the conductor 38 in any suitable manner.

In order to relatively tightly secure the plates 36 and 37 to either side of the insulating plate 35 the conductor 38 is in the form of a stud and has an end threaded for cooperatively receiving a nut 39. The plate 36 is provided with a recessed portion 40 for receiving a gasket or washer 41 which has a normal size slightly larger than that of the recessed portion 40, so that when the nut 39 is tightly secured against the outer surface of the plate 36 the plates 36 and 37 will be tightly secured on both sides of the insulating plate 35 and the gasket 41 will be deformed so that it is relatively tightly forced against the cooperating surfaces of the plate 36, conductor 38, and insulating plate 35. A gasket 42 may be provided if desired between the plate 37 and the adjacent surface of the insulating plate 35.

In the construction illustrated in Fig. 6 it will be seen that the separate bolts for attaching the plates to both sides of the insulating plate are dispensed with so that a very simple and efficient structure is provided, particularly for seals which are adapted for conductors of the smaller rated transformers. The connection between the outer end of the conductor 38 and a conductor 43 may be made in any suitable manner, such as through a connector 44 on the end of the conductor 43 and a nut 45 which may tightly secure the cooperating surface of the connector 44 against the outer surface of the nut 39.

Modifications of the particular arrangements which I have disclosed embodying my invention will occur to those skilled in the art, so that I do not desire my invention to be limited to the particular arrangements set forth, and I intend in the appended claims to cover all modifications which do not depart from the spirit or scope of my invention.

What I claim as new and desire to secure by Letters Patent of the United States is:

1. In an electric apparatus, a conducting casing, a winding in said casing having a plurality of bar conductors by means of which external circuit connections are made to said winding, a relatively large aperture in said casing through which said plurality of conductors pass, a rigid insulating plate having as many spaced openings as there are conductors, means including a sealing element for fastening said plate to said casing so as to constitute a gas-tight closure around the edges of said aperture, said openings being of substantially the same size and shape as the cross section of said conductors, said conductors being passed respectively through said openings so that said plate also comprises an insulating spacer for said conductors, and separate means surrounding each conductor for providing a gas-tight seal between each conductor and said insulating plate.

2. In an electric apparatus, a conducting casing, a winding in said casing having a plurality of bar conductors of non-circular cross section by means of which external circuit connections are made to said winding, a relatively large aperture in said casing through which said plurality of conductors pass, a rigid insulating plate having as many spaced openings as there are conductors, means including a gasket for fastening said plate to said casing so as to constitute a gas-tight closure around the edges of said aperture, said openings being of substantially the same size and shape as the cross section of said conductors, said conductors being passed through said openings so that said plate also comprises an insulating spacer for said conductors, and separate clamping means for providing a gas-tight seal between each conductor and said insulating plate, each of said clamping means comprising metal plate members around each conductor on opposite sides of said insulating plate, non-metallic gaskets around each conductor between said metal plate members and said insulating plate, and means independent of said conductors for clamping said metal plate members tightly to opposite surfaces of said insulating plate.

3. The combination as in claim 2 in which said last-mentioned gaskets are seated in recesses in at least one of the plate members which surround said conductors.

MAGNUS UNGER.